United States Patent
Worsham, II

(10) Patent No.: US 10,386,843 B2
(45) Date of Patent: Aug. 20, 2019

(54) SYSTEM AND METHOD FOR DETERMINING A POSITION OF A ROTORCRAFT

(71) Applicant: Bell Helicopter Textron Inc., Fort Worth, TX (US)

(72) Inventor: Robert Earl Worsham, II, Weatherford, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 225 days.

(21) Appl. No.: 15/477,944

(22) Filed: Apr. 3, 2017

(65) Prior Publication Data
US 2018/0284778 A1    Oct. 4, 2018

(51) Int. Cl.
| | |
|---|---|
| G05D 1/02 | (2006.01) |
| G05D 1/00 | (2006.01) |
| G01S 19/40 | (2010.01) |
| B64C 13/50 | (2006.01) |
| G01C 21/16 | (2006.01) |
| G01S 19/49 | (2010.01) |

(Continued)

(52) U.S. Cl.
CPC ......... G05D 1/0202 (2013.01); B64C 13/503 (2013.01); B64C 27/06 (2013.01); G01C 21/165 (2013.01); G01S 19/40 (2013.01); G01S 19/49 (2013.01); G05D 1/0077 (2013.01); G05D 1/101 (2013.01); G01S 19/15 (2013.01)

(58) Field of Classification Search
CPC ....... B64C 13/18; B64C 13/42; B64C 13/503; B64C 27/56; B64C 27/57; B64C 27/59; B64C 27/64; B64C 27/68; G01C 21/165; G01S 19/15; G01S 19/40; G01S 19/49; G05D 1/0077; G05D 1/0202; G05D 1/0816; G05D 1/0858; G05D 1/102
See application file for complete search history.

(56) References Cited

U.S. PATENT DOCUMENTS

| | | | | |
|---|---|---|---|---|
| 4,580,223 | A | * | 4/1986 | Wright ................. G05D 1/0061 244/17.13 |
| 5,787,384 | A | * | 7/1998 | Johnson ............... G01C 21/165 701/472 |

(Continued)

FOREIGN PATENT DOCUMENTS

| | | |
|---|---|---|
| WO | 0455580 A2 | 5/1991 |
| WO | 2015105597 A2 | 7/2015 |

OTHER PUBLICATIONS

Jensen et al. Challenges for Positioning and Navigation in the Arctic "https://mycoordinates.org/challenges-for-positioning-and-navigation-in-the-arctic/" (Year : 2010).*

Primary Examiner — Thomas G Black
Assistant Examiner — Ce Li Li
(74) Attorney, Agent, or Firm — Slater Matsil, LLP

(57) ABSTRACT

In accordance with an embodiment, a method of operating a rotorcraft includes operating the rotorcraft in a position hold mode by determining whether GPS position data is usable, receiving a position of the rotorcraft from a GPS sensor, determining a position error based on received GPS position data and a held position when the GPS position data is usable, determining the position error based on a rotorcraft velocity when the GPS position data is not usable, and transmitting an actuator command based on the determined position error.

14 Claims, 7 Drawing Sheets

(51) Int. Cl.
*G05D 1/10* (2006.01)
*B64C 27/06* (2006.01)
*G01S 19/15* (2010.01)

(56) References Cited

U.S. PATENT DOCUMENTS

| | | | | |
|---|---|---|---|---|
| 2003/0149528 A1* | 8/2003 | Lin | ...................... | G01C 21/165 |
| | | | | 701/472 |
| 2007/0100546 A1* | 5/2007 | Ring | ...................... | G01C 21/16 |
| | | | | 701/478 |
| 2014/0027564 A1* | 1/2014 | Mercer | ................... | B64C 27/56 |
| | | | | 244/17.13 |

* cited by examiner

SYSTEM AND METHOD FOR DETERMINING A POSITION OF A ROTORCRAFT

TECHNICAL FIELD

The present invention relates generally to a system and method for a flight control, and, in particular embodiments, to a system and method for determining a position of a rotorcraft.

BACKGROUND

Fly-by-wire systems in aircraft, as opposed to mechanically controlled systems, use electronic signals to control the flight surfaces and engines in the aircraft. For example, instead of having the pilot controls mechanically linked to the control surfaces via a hydraulic system, the pilot controls are electronically linked to a flight computer, which, in turn, controls flight surface actuators via electronic signals. By further interfacing the flight computer to aircraft sensors, sophisticated control algorithms may be used to provide autopilot functionality, as well as to stabilize and control the aircraft.

While fly-by-wire systems have become commonplace in commercial and civilian fixed wing aircraft, their adoption among rotorcraft, such as helicopters, has been much slower. However, by adopting fly-by-wire systems in helicopters, safer operation may be achieved in difficult flight environments such as low speed, low altitude, degraded visual environments and inclement weather. Another area in which fly-by-wire systems may benefit rotorcraft is in the reduction in pilot workload. By providing automated features such as stabilization in response to wind, control axis decoupling, position hold and heading hold functionality, the pilot is freed up to focus on the environment in which he or she flies.

SUMMARY

In accordance with an embodiment, a method of operating a rotorcraft includes operating the rotorcraft in a position hold mode by determining whether GPS position data is usable, receiving a position of the rotorcraft from a GPS sensor, determining a position error based on received GPS position data and a held position when the GPS position data is usable, determining the position error based on a rotorcraft velocity when the GPS position data is not usable, and transmitting an actuator command based on the determined position error.

BRIEF DESCRIPTION OF THE DRAWINGS

For a more complete understanding of the present invention, and the advantages thereof, reference is now made to the following descriptions taken in conjunction with the accompanying drawings, in which.

Figure 1:
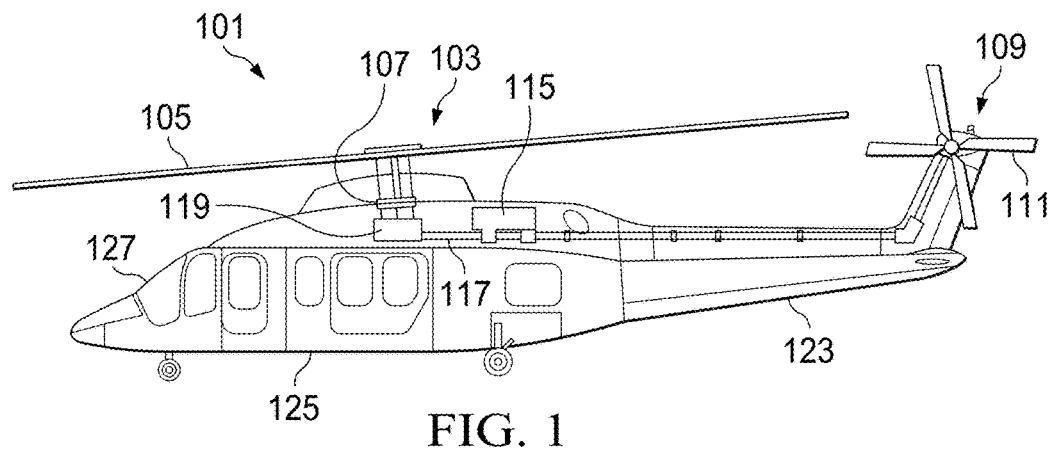
FIG. 1 illustrates an embodiment rotorcraft.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The increasing use of rotorcraft, in particular, for commercial and industrial applications, has led to the development of larger more complex rotorcraft. However, as rotorcraft become larger and more complex, the differences between flying rotorcraft and fixed wing aircraft has become more pronounced. Since rotorcraft use one or more main rotors to simultaneously provide lift, control attitude, control altitude, and provide lateral or positional movement, different flight parameters and controls are tightly coupled to each other, as the aerodynamic characteristics of the main rotors affect each control and movement axis. For example, the flight characteristics of a rotorcraft at cruising speed or high speed may be significantly different than the flight characteristics at hover or at relatively low speeds. Additionally, different flight control inputs for different axes on the main rotor, such as cyclic inputs or collective inputs, affect other flight controls or flight characteristics of the rotorcraft. For example, pitching the nose of a rotorcraft forward to increase forward speed will generally cause the rotorcraft to lose altitude. In such a situation, the collective may be increased to maintain level flight, but the increase in collective causes increased power to the main rotor which, in turn, requires additional anti-torque force from the tail rotor. This is in contrast to fixed wing systems where the control inputs are less closely tied to each other and flight characteristics in different speed regimes are more closely related to each other.

Recently, fly-by-wire (FBW) systems have been introduced in rotorcraft to assist pilots in stably flying the rotorcraft and to reduce workload on the pilots. The FBW system may provide different control characteristics or responses for cyclic, pedal or collective control input in the different flight regimes, and may provide stability assistance or enhancement by decoupling physical flight characteristics so that a pilot is relieved from needing to compensate for some flight commands issued to the rotorcraft. FBW systems may be implemented in one or more flight control computers (FCCs) disposed between the pilot controls and flight control systems, providing corrections to flight controls that assist in operating the rotorcraft more efficiently or that put the rotorcraft into a stable flight mode while still allowing the pilot to override the FBW control inputs. The FBW systems in a rotorcraft may, for example, automatically adjust power output by the engine to match a collective control input, apply collective or power correction during a cyclic control input, provide automation of one or more flight control procedures, provide for default or suggested control positioning, or the like.

FBW systems for rotorcraft must provide stable flight characteristics for FBW controlled flight parameters while permitting the pilot to override or adjust any suggested flight parameters suggested by the FBW system. Additionally, in providing enhanced control and automated functionality for rotorcraft flight, the FBW system must maintain an intuitive and easy to use flight control system for the pilot. Thus, the FBW system adjusts the pilot flight controls so that the controls are in a position associated with the relevant flight parameter. For example, the FBW system may adjust the collective stick to provide suggested or FBW controlled flight parameters, and which reflect a collective or power setting. Thus, when the pilot releases the collective stick and the FBW system provides collective control commands, the collective stick is positioned intuitively in relation to the actual power or collective setting so that, when the pilot grasps the collective stick to retake control, the control stick is positioned where the pilot expects the stick to be positioned for the actual collective setting of the main rotor. Similarly, the FBW system uses the cyclic stick to, for example, adjust for turbulence, drift or other disturbance to the flight path, and may move the cyclic stick as the FBW system compensates the cyclic control. Thus, when the pilot grasps the cyclic stick to take control of flight from the FBW system, the cyclic stick is positioned to reflect the actual cyclic settings.

Embodiments of the present disclosure will be described with respect to preferred embodiments in a specific context, namely a system and method for determining a position of a rotorcraft.

One notable feature of a fly-by-wire rotorcraft is the ability of the rotorcraft to automatically hold a fixed position. Generally, a rotorcraft flight control system holds the fixed position hold by monitoring the actual position of the helicopter, determining a difference between the actual position of the helicopter and a desired position of the rotorcraft, and adjusting actuators attached to the main rotor until the difference between the actual position of the helicopter and the desired position is minimized or reduced using feedback control. Thus, the ability to control the position of the rotorcraft relies, in part, in obtaining well-behaved position information. While many rotorcraft systems rely on the global positioning system (GPS) to accurately determine their location, there some circumstances in which a rotorcraft's GPS system may fail to produce reliable location coordinates. These situations include, for example, signal fading due to adverse weather conditions, on-board system failures of the rotorcraft, and operation of the rotorcraft in geographic regions such as high latitudes. Operation at high latitudes (near the geographic poles) presents multiple difficulties for GPS receivers. One such difficulty is that operation in such regions often provides fewer than four GPS satellites within the line of sight of the rotorcraft. This is because the GPS satellite constellation is positioned to best serve the majority of users.

In addition to these concerns, there is a fundamental issue with the manner in which the polar coordinate system (latitude and longitude) is depicted near the poles and the manner in which rotorcraft use position data. Latitude and Longitude, being angular measurements, are convenient for representing a location on a sphere. However, rotorcraft position hold control laws operate on linear deviation from the desired position rather than on angular deviation. Thus, the angular distance between two points are converted to an equivalent linear distance. This conversion is a straightforward calculation, but presents issues when faced with the constraints of digital computers with finite resources. Because lines of longitude become closer together near the poles, the effective sensitivity of the conversion from angular to linear distance changes. It is difficult to perform this conversion using floating point math in a digital computer such that the resultant linear deviation has both the large range need for operation near the equator and the fine resolution required near the poles. This problem is unique to rotorcraft using GPS position to provide position hold. Fixed wing aircraft or helicopters which do not provide hover control are generally unaffected, as they have no need to compute the very small differences in position. In most circumstances, such a high level of resolution is not required when operating at high speed.

In an embodiment of the present invention, a rotorcraft flight control system nominally relies on GPS location data to provide a position hold coordinate. However, when GPS location data is unavailable and/or deemed to be unreliable, the rotorcraft flight control system relies on integrated velocity measurements to determine a position error in order for the rotorcraft to maintain a held position. The velocity measurement may be derived by the GPS system by monitoring the carrier frequencies of received GPS signals and/or may be determined using one or more on-board accelerometers or inertial measurement units. In some embodiments, accelerometers or inertial measurements may be used to further enhance or correct GPS location data. It should be understood that embodiments of the present invention may be directed toward systems that utilize other satellite-based navigation systems such as the Russian global navigation satellite system (GLONASS), the Chinese BeiDou system, the European Galileo system and the Indian NAVIC system.

FIG. 1 illustrates a rotorcraft 101 according to some embodiments. The rotorcraft 101 has a main rotor system 103, which includes a plurality of main rotor blades 105. The pitch of each main rotor blade 105 may be controlled by a swashplate 107 in order to selectively control the attitude, altitude and movement of the rotorcraft 101. The swashplate 107 may be used to collectively and/or cyclically change the pitch of the main rotor blades 105. The rotorcraft 101 also has an anti-torque system, which may include a tail rotor 109, no-tail-rotor (NOTAR), or dual main rotor system. In rotorcraft with a tail rotor 109, the pitch of each tail rotor blade 111 is collectively changed in order to vary thrust of the anti-torque system, providing directional control of the rotorcraft 101. The pitch of the tail rotor blades 111 is changed by one or more tail rotor actuators. In some embodiments, the FBW system sends electrical signals to the tail rotor actuators or main rotor actuators to control the flight of the rotorcraft.

Power is supplied to the main rotor system 103 and the anti-torque system by engines 115. There may be one or more engines 115, which may be controlled according to signals from the FBW system. The output of the engine 115 is provided to a driveshaft 117, which is mechanically and operatively coupled to the rotor system 103 and the anti-torque system through a main rotor transmission 119 and a tail rotor transmission, respectively.

The rotorcraft 101 further includes a fuselage 125 and tail section 123. The tail section 123 may have other flight control devices such as horizontal or vertical stabilizers, rudder, elevators, or other control or stabilizing surfaces that are used to control or stabilize the flight of the rotorcraft 101. The fuselage 125 includes a cockpit 127, which includes displays, controls, and instruments. It should be appreciated that even though rotorcraft 101 is depicted as having certain illustrated features, the rotorcraft 101 may have a variety of implementation-specific configurations. For instance, in some embodiments, cockpit 127 is configured to accommodate a pilot or a pilot and co-pilot, as illustrated. It is also contemplated, however, that rotorcraft 101 may be operated remotely, in which case cockpit 127 could be configured as a fully functioning cockpit to accommodate a pilot (and possibly a co-pilot as well) to provide for greater flexibility of use, or could be configured with a cockpit having limited functionality (e.g., a cockpit with accommodations for only one person who would function as the pilot operating perhaps with a remote co-pilot or who would function as a co-pilot or back-up pilot with the primary piloting functions being performed remotely). In yet other contemplated embodiments, rotorcraft 101 could be configured as an unmanned vehicle, in which case cockpit 127 could be eliminated entirely in order to save space and cost.

Figure 2:
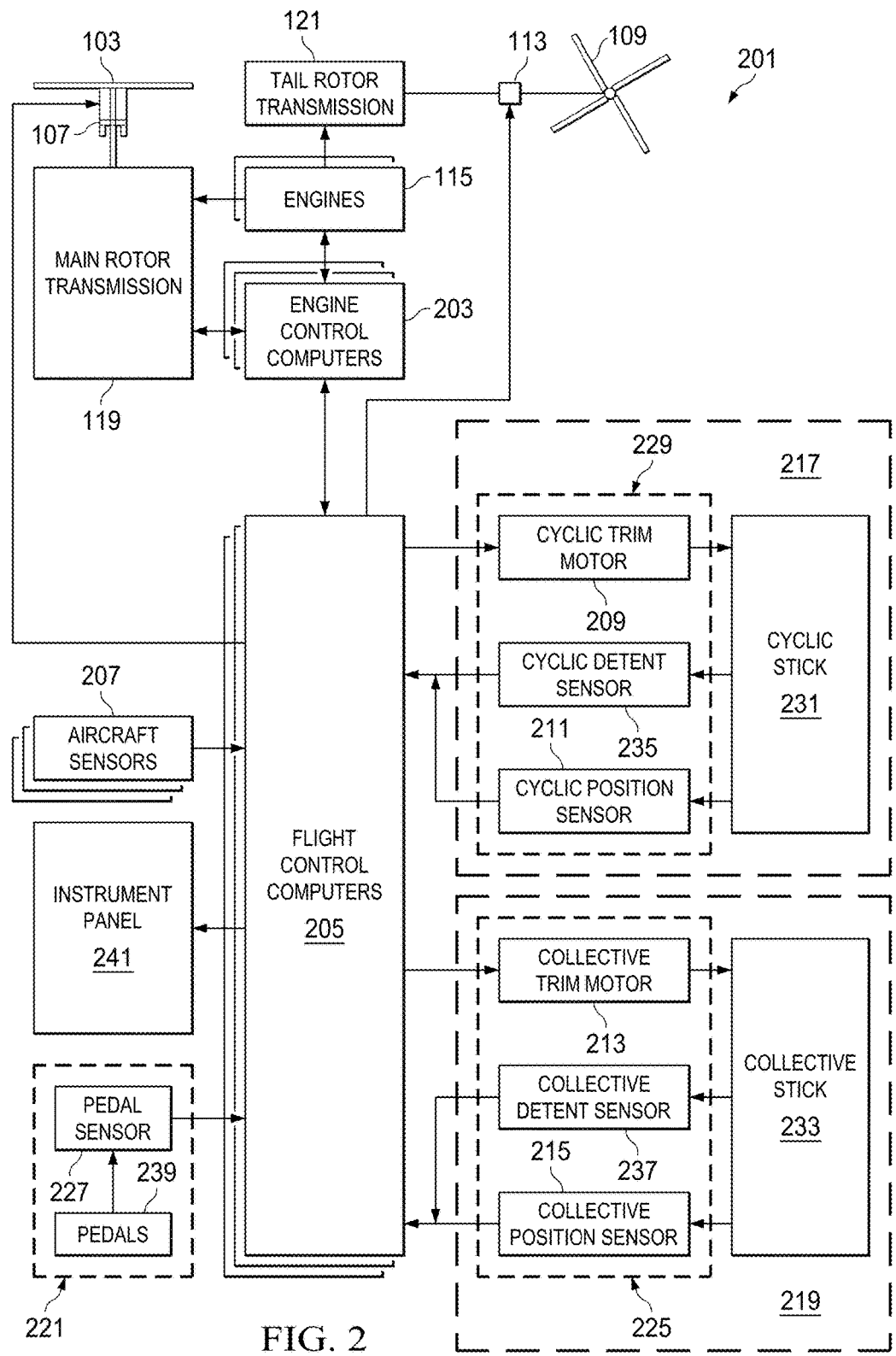
FIG. 2 illustrates a block diagram of an embodiment rotorcraft flight control system.

FIG. 2 illustrates a fly-by-wire flight control system 201 for a rotorcraft according to some embodiments. A pilot may manipulate one or more pilot flight controls in order to control the flight of the rotorcraft. The pilot flight controls may include manual controls such as a cyclic stick 231 in a cyclic control assembly 217, a collective stick 233 in a collective control assembly 219, and pedals 239 in a pedal assembly 221. Inputs provided by the pilot to the pilot flight controls may be transmitted mechanically and/or electronically (e.g., via the FBW flight control system) to flight control devices by the flight control system 201. Flight control devices may represent devices operable to change the flight characteristics of the rotorcraft. Flight control devices on the rotorcraft may include mechanical and/or electrical systems operable to change the positions or angle of attack of the main rotor blades 105 and the tail rotor blades 111 or to change the power output of the engines 115, as examples. Flight control devices include systems such as the swashplate 107, tail rotor actuator 113, and systems operable to control the engines 115. The flight control system 201 may adjust the flight control devices independently of the flight crew in order to stabilize the rotorcraft, reduce the workload of the flight crew, and the like. The flight control system 201 includes engine control computers (ECCUs) 203, flight control computers 205, and aircraft sensors 207, which collectively adjust the flight control devices.

The flight control system 201 has one or more flight control computers 205 (FCCs). In some embodiments, multiple FCCs 205 are provided for redundancy. One or more modules within the FCCs 205 may be partially or wholly embodied as software and/or hardware for performing any functionality described herein. In embodiments where the flight control system 201 is a FBW flight control system, the FCCs 205 may analyze pilot inputs and dispatch corresponding commands to the ECCUs 203, the tail rotor actuator 113, and/or actuators for the swashplate 107. Further, the FCCs 205 are configured and receive input commands from the pilot controls through sensors associated with each of the pilot flight controls. The input commands are received by measuring the positions of the pilot controls. The FCCs 205 also control tactile cueing commands to the pilot controls or display information in instruments on, for example, an instrument panel 241.

The ECCUs 203 control the engines 115. For example, the ECCUs 203 may vary the output power of the engines 115 to control the rotational speed of the main rotor blades or the tail rotor blades. The ECCUs 203 may control the output power of the engines 115 according to commands from the FCCs 205, or may do so based on feedback such a measured revolutions per minute (RPM) of the main rotor blades.

The aircraft sensors 207 are in communication with the FCCs 205. The aircraft sensors 207 may include sensors for measuring a variety of rotorcraft systems, flight parameters, environmental conditions and the like. For example, the aircraft sensors 207 may include sensors for measuring airspeed, altitude, attitude, position, orientation, temperature, airspeed, vertical speed, and the like. Other sensors 207 could include sensors relying upon data or signals originating external to the rotorcraft, such as a global positioning system (GPS) sensor, a VHF Omnidirectional Range sensor, Instrument Landing System (ILS), and the like.

The cyclic control assembly 217 is connected to a cyclic trim assembly 229 having one or more cyclic position sensors 211, one or more cyclic detent sensors 235, and one or more cyclic actuators or cyclic trim motors 209. The cyclic position sensors 211 measure the position of the cyclic control stick 231. In some embodiments, the cyclic control stick 231 is a single control stick that moves along two axes and permits a pilot to control pitch, which is the vertical angle of the nose of the rotorcraft and roll, which is the side-to-side angle of the rotorcraft. In some embodiments, the cyclic control assembly 217 has separate cyclic position sensors 211 that measuring roll and pitch separately. The cyclic position sensors 211 for detecting roll and pitch generate roll and pitch signals, respectively, (sometimes referred to as cyclic longitude and cyclic latitude signals, respectively) which are sent to the FCCs 205, which controls the swashplate 107, engines 115, tail rotor 109 or related flight control devices.

The cyclic trim motors 209 are connected to the FCCs 205, and receive signals from the FCCs 205 to move the cyclic control stick 231. In some embodiments, the FCCs 205 determine a suggested cyclic stick position for the cyclic stick 231 according to one or more of the collective stick position, the pedal position, the speed, altitude and attitude of the rotorcraft, the engine revolutions per minute (RPM), engine temperature, main rotor RPM, engine torque or other rotorcraft system conditions or flight conditions. The suggested cyclic stick position is a position determined by the FCCs 205 to give a desired cyclic action. In some embodiments, the FCCs 205 send a suggested cyclic stick position signal indicating the suggested cyclic stick position to the cyclic trim motors 209. While the FCCs 205 may command the cyclic trim motors 209 to move the cyclic stick 231 to a particular position (which would in turn drive actuators associated with swashplate 107 accordingly), the cyclic position sensors 211 detect the actual position of the cyclic stick 231 that is set by the cyclic trim motors 206 or input by the pilot, allowing the pilot to override the suggested cyclic stick position. The cyclic trim motor 209 is connected to the cyclic stick 231 so that the pilot may move the cyclic stick 231 while the trim motor is driving the cyclic stick 231 to override the suggested cyclic stick position. Thus, in some embodiments, the FCCs 205 receive a signal from the cyclic position sensors 211 indicating the actual cyclic stick position, and do not rely on the suggested cyclic stick position to command the swashplate 107.

Similar to the cyclic control assembly 217, the collective control assembly 219 is connected to a collective trim assembly 225 having one or more collective position sensors 215, one or more collective detent sensors 237, and one or more collective actuators or collective trim motors 213. The collective position sensors 215 measure the position of a collective control stick 233 in the collective control assembly 219. In some embodiments, the collective control stick 233 is a single control stick that moves along a single axis or with a lever type action. A collective position sensor 215 detects the position of the collective control stick 233 and sends a collective position signal to the FCCs 205, which controls engines 115, swashplate actuators, or related flight control devices according to the collective position signal to control the vertical movement of the rotorcraft. In some embodiments, the FCCs 205 may send a power command signal to the ECCUs 203 and a collective command signal to the main rotor or swashplate actuators so that the angle of attack of the main blades is raised or lowered collectively, and the engine power is set to provide the needed power to keep the main rotor RPM substantially constant.

The collective trim motor 213 is connected to the FCCs 205, and receives signals from the FCCs 205 to move the collective control stick 233. Similar to the determination of the suggested cyclic stick position, in some embodiments, the FCCs 205 determine a suggested collective stick position for the collective control stick 233 according to one or more of the cyclic stick position, the pedal position, the speed, altitude and attitude of the rotorcraft, the engine RPM, engine temperature, main rotor RPM, engine torque or other rotorcraft system conditions or flight conditions. The FCCs 205 generate the suggested collective stick position and send a corresponding suggested collective stick signal to the collective trim motors 213 to move the collective stick 233 to a particular position. The collective position sensors 215 detect the actual position of the collective stick 233 that is set by the collective trim motor 213 or input by the pilot, allowing the pilot to override the suggested collective stick position.

The pedal control assembly 221 has one or more pedal sensors 227 that measure the position of pedals or other input elements in the pedal control assembly 221. In some embodiments, the pedal control assembly 221 is free of a trim motor or actuator, and may have a mechanical return element that centers the pedals when the pilot releases the pedals. In other embodiments, the pedal control assembly 221 has one or more trim motors that drive the pedal to a suggested pedal position according to a signal from the FCCs 205. The pedal sensor 227 detects the position of the pedals 239 and sends a pedal position signal to the FCCs 205, which controls the tail rotor 109 to cause the rotorcraft to yaw or rotate around a vertical axis.

The cyclic and collective trim motors 209 and 213 may drive the cyclic stick 231 and collective stick 233, respectively, to suggested positions. The cyclic and collective trim motors 209 and 213 may drive the cyclic stick 231 and collective stick 233, respectively, to suggested positions, but this movement capability may also be used to provide tactile cueing to a pilot. The trim motors 209 and 213 may push the respective stick in a particular direction when the pilot is moving the stick to indicate a particular condition. Since the FBW system mechanically disconnects the stick from one or more flight control devices, a pilot may not feel a hard stop, vibration, or another tactile cue that would be inherent in a stick that is mechanically connected to a flight control assembly. In some embodiments, the FCCs 205 may cause the trim motors 209 and 213 to push against a pilot command so that the pilot feels a resistive force, or may command one or more friction devices to provide friction that is felt when the pilot moves the stick. Thus, the FCCs 205 control the feel of a stick by providing pressure and/or friction on the stick.

Additionally, the cyclic control assembly 217, collective control assembly 219 and/or pedal control assembly 221 may each have one or more detent sensors that determine whether the pilot is handling a particular control device. For example, the cyclic control assembly 217 may have a cyclic detent sensor 235 that determines that the pilot is holding the cyclic stick 231, while the collective control assembly 219 has a collective detent sensor 237 that determines whether the pilot is holding the collective stick 233. These detent sensors 235, 237 detect motion and/or position of the respective control stick that is caused by pilot input, as opposed to motion and/or position caused by commands from the FCCs 205, rotorcraft vibration, and the like and provide feedback signals indicative of such to the FCCs. When the FCCs 205 detect that a pilot has control of, or is manipulating, a particular control, the FCCs 205 may determine that stick to be out-of-detent (OOD). Likewise, the FCCs may determine that the stick is in-detent (ID) when the signals from the detent sensors indicate to the FCCs 205 that the pilot has released a particular stick. The FCCs 205 may provide different default control or automated commands to one or more flight systems based on the detent status of a particular stick or pilot control.

Figure 3:
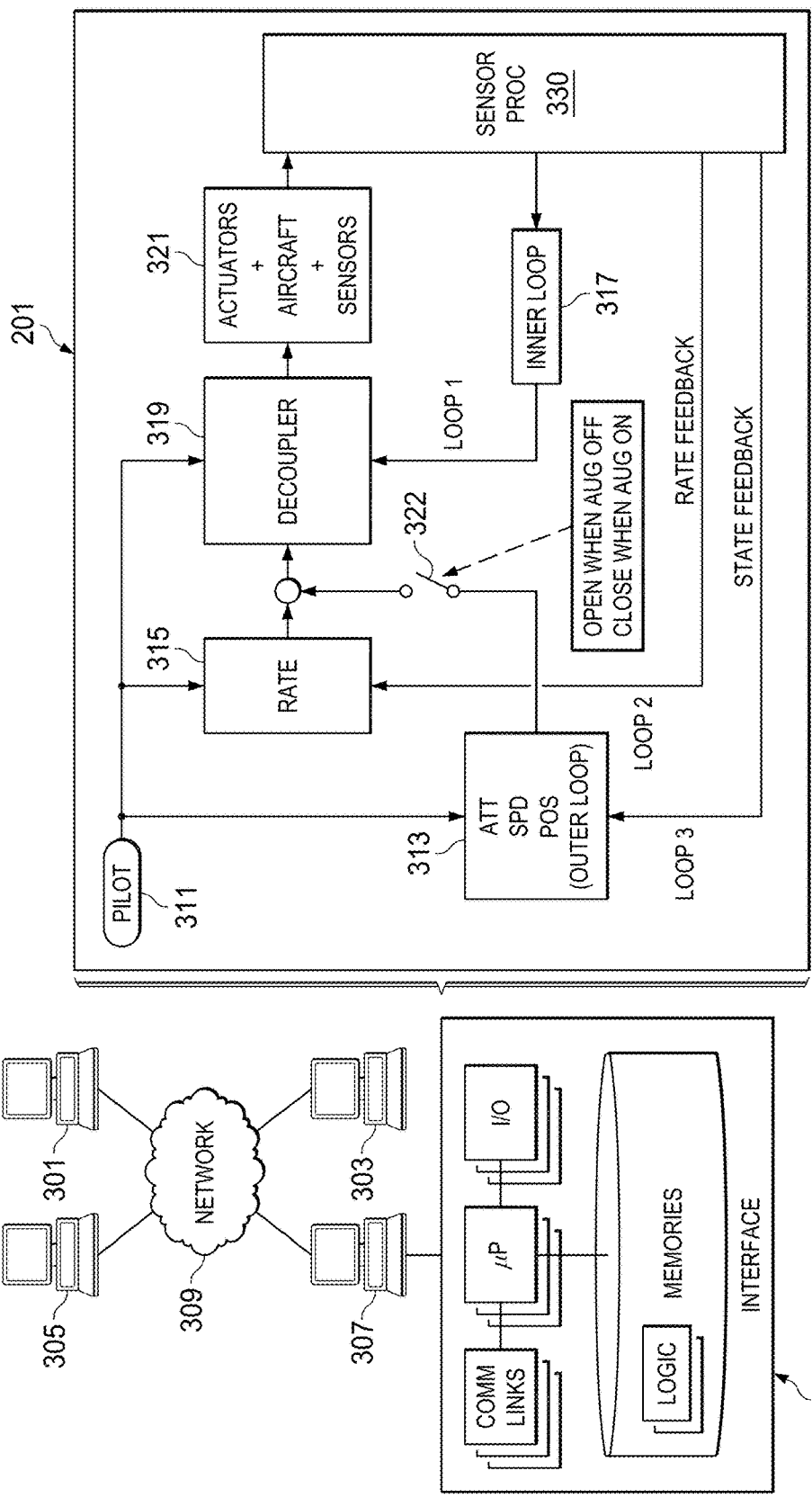
FIG. 3 illustrates a block diagram of an embodiment flight control system.

Moving now to the operational aspects of flight control system 201, FIG. 3 illustrates in a highly schematic fashion, a manner in which flight control system 201 may implement FBW functions as a series of interrelated feedback loops running certain control laws. FIG. 3 representatively illustrates a three-loop flight control system 201 according to an embodiment. In some embodiments, elements of the three-loop flight control system 201 may be implemented at least partially by FCCs 205. As shown in FIG. 3, however, all, some, or none of the components (301, 303, 305, 307) of three-loop flight control system 201 could be located external or remote from the rotorcraft 100 and communicate to on-board devices through a network connection 309.

The three-loop flight control system 201 of FIG. 3 has a pilot input 311, an outer loop 313, a rate (middle) loop 315, an inner loop 317, a decoupler 319, and aircraft equipment 321 (corresponding, e.g., to flight control devices such as swashplate 107, tail rotor transmission 212, etc., to actuators (not shown) driving the flight control devices, to sensors such as aircraft sensors 207, position sensors 211, 215, detent sensors 235, 237, etc., and the like).

In the example of FIG. 3, a three-loop design separates the inner stabilization and rate feedback loops from outer guidance and tracking loops. The control law structure primarily assigns the overall stabilization task and related tasks of reducing pilot workload to inner loop 317. Next, middle loop 315 provides rate augmentation. Outer loop 313 focuses on guidance and tracking tasks. Since inner loop 317 and rate loop 315 provide most of the stabilization, less control effort is required at the outer loop level. As representatively illustrated in FIG. 3, a switch 322 may be provided to turn outer loop flight augmentation on and off, as the tasks of outer loop 313 are not necessary for flight stabilization.

In some embodiments, the inner loop 317 and rate loop 315 include a set of gains and filters applied to roll/pitch/yaw 3-axis rate gyro and acceleration feedback sensors. Both the inner loop and rate loop may stay active, independent of various outer loop hold modes. Outer loop 313 may include cascaded layers of loops, including an attitude loop, a speed loop, a position loop, a vertical speed loop, an altitude loop, and a heading loop. In accordance with some embodiments, the control laws running in the illustrated the loops allow for decoupling of otherwise coupled flight characteristics, which in turn may provide for more stable flight characteristics and reduced pilot workload. Furthermore, the outer loop 313 may allow for automated or semi-automated operation of certain high-level tasks or flight patterns, thus further relieving the pilot workload and allowing the pilot to focus on other matters including observation of the surrounding terrain. In some embodiments, data produced by sensors within aircraft equipment 321 are conditioned by sensor processing block 330. Sensor processing block may reformat and rescale data to make the sensor data compatible with flight control algorithms, provide dynamic pre-filtering of the sensor signals and perform coordinate transformations of GPS location data from Earth axis coordinates to rotorcraft body coordinates.

Figure 4A:
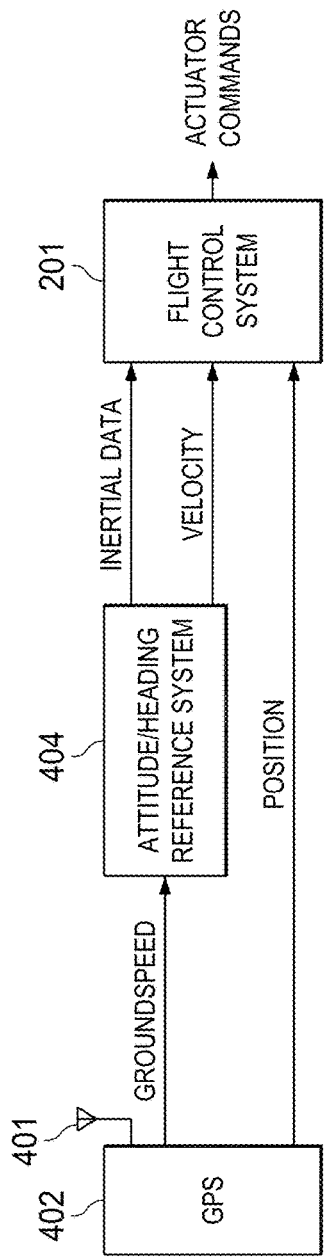
FIG. 4a illustrates a block diagram showing an embodiment GPS system, an attitude/heading reference system, and a flight control system.

FIG. 4a illustrates a block diagram showing the functional relationship between GPS system 402, AHRS 404 and flight control system 201. As shown, GPS system 402 provides position data to flight control system 201 and ground speed data to AHRS 404. AHRS 404, in turn, provides inertial and velocity data to flight control system 201. During operation, sensor processing block 330 of flight control system 201 makes use of the position data from GPS system 402 and the velocity and inertial data from AHRS 404 to provide data for a position hold loop.

GPS system 402 includes antenna 401 and is configured to determine a position and ground speed based on signals received from GPS satellites. High-resolution position data is determined based on signals received from four GPS satellites, while ground speed data may be determined using fewer satellites. The functionality of GPS system 402 may be determined by the GPS system 402 itself and/or by flight control system 201 and AHRS 404. For example, if flight control system 201 determines that the received GPS data is in the wrong format, is outside of expected parameters (e.g., longitude greater than 90 degrees) or is otherwise unrecognizable, flight control system 201 treats the incoming position data as being not usable and relies on position information derived by integrating ground speed measurements. These ground speed measurements may be determined, for example, by GPS system 402, by AHRS 404 or by other systems such as Doppler Sensor or LIDAR (Light Detecting and Ranging) equipment. In some embodiments, GPS system 402 may be a subsystem of an avionics or autopilot system, such as a Garmin Integrated Avionics (GIA) system, that also provides various flight instrumentation, data processing and radio functionality in addition to determining GPS position and velocity measurements.

Attitude/heading reference system (AHRS) 404 may include accelerometers, gyroscopes, magnetometers, and other systems that determine the attitude, velocity and acceleration of the rotorcraft on its various axes. AHRS 404 may also provide data processing functionality and include interface circuitry between GPS system 402 and flight control system 201. AHRS 404 may also be configured to derive a velocity value based, for example, on adjusting the ground speed calculated by GPS system 402 using the output of on-board accelerometers and other sensors or a short-term velocity value following loss of groundspeed inputs based on integrating the output of the accelerometers, given the initial ground speed measurements prior to the loss of groundspeed inputs. In various embodiments, data communications between AHRS 404, GPS system 402 and flight control system 201 operate according to the ARINC-429 avionics data bus standard. Alternatively, other bus standards could be used according to the particular system and its specifications.

Figure 4B:
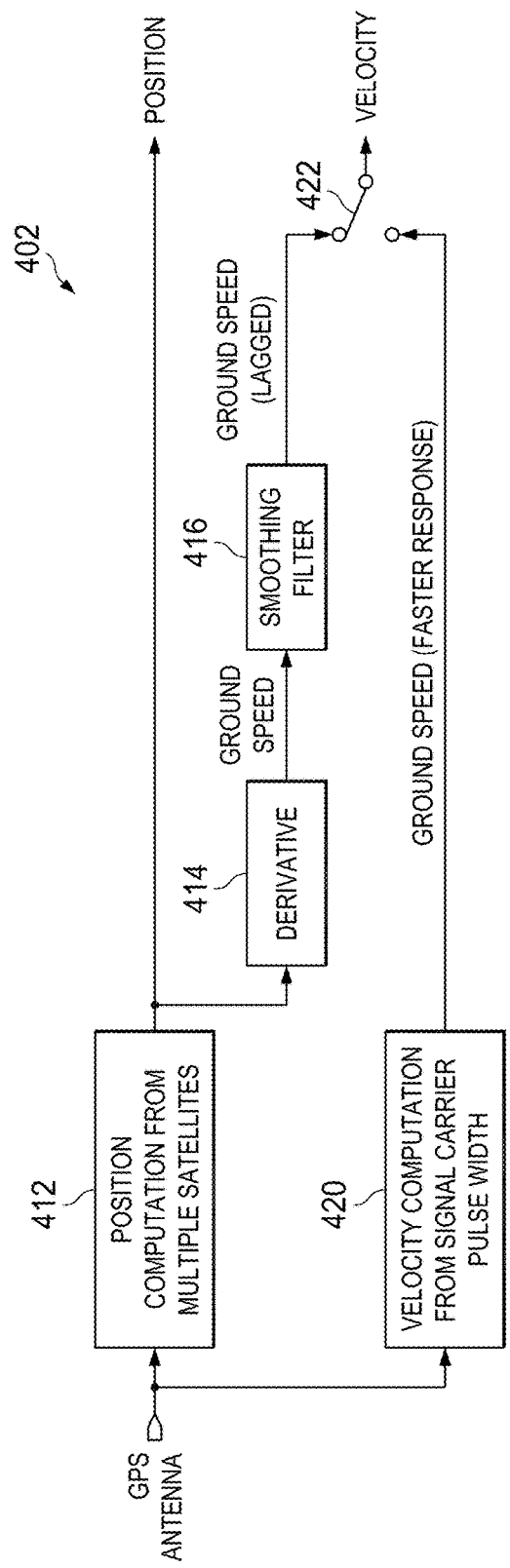
FIG. 4b illustrates a block diagram of an embodiment GPS system.

FIG. 4b illustrates a block diagram of a portion of GPS system 402. As shown, GPS system 402 includes position calculation block 412 that determines a position of the rotorcraft based on signals received from multiple GPS satellites. This position measurement is used by flight control system 201 to determine a present position. As mentioned above, the ability of GPS system 402 to provide an accurate position may be compromised due to system failures and geographic location. In some embodiments, ground speed may be calculated by taking a derivative 414 of the calculated position. Such a derivative may be determined, for example by subtracting or determining a distance between successive positions. Smoothing filter 416 may perform a lowpass filtering of the output of derivative block in to provide a smoothed ground speed signal. This smoothed ground speed signal at the output of smoothing filter 416, however, has some phase delay and lags the ground speed at the input to smoothing filter 416.

GPS system 402 may also calculate the ground speed of the rotorcraft by analyzing the carrier frequencies or the pulse widths of the received GPS signals using block 420, which leads to a faster response than using derivative block 414 and smoothing filter 416. This process essentially measures the Doppler shift of the carrier frequency transmitted by multiple GPS satellites. Generally, the Doppler shift involves a change in frequency (or perceived frequency) of a waveform generated by one body and observed by a second body which is allowed to move relative to the first body. If the two bodies are moving toward each other, the frequency observed by the second body appears to be higher. If the two bodies are moving apart, the frequency will appear lower. Since the GPS receiver knows the nominal frequency of the GPS carrier signal and can very accurately measure the received frequency, a relative velocity between the satellite and receiver can be determined based on these two frequencies. When multiple GPS signals are used, a velocity vector of the rotorcraft can be determined. The selection of which ground speed calculation (e.g., using the filtered position difference via blocks 412, 414 and 416 or based on the GPS carrier signal using block 420) may be performed using switch 422.

In various embodiments, the velocity determined by GPS system 402, either by taking a filtered difference of the GPS determined position or by determining a velocity based on the carrier frequencies of the received GPS signals, is sufficiently accurate for steady state conditions. However, for dynamic conditions, such as windy conditions where the rotorcraft is rapidly being pushed back and forth, the time that it takes GPS system 402 may be slow to update. Thus, in some embodiments, AHRS 404 combines the long term velocity measurements provided by GPS system 402 with a short-term estimate of the velocity from the acceleration measured by inertial sensors. This may be accomplished, for example, by using an optional complimentary filter that may be implemented, for example, in AHRS 404.

Figure 4C:
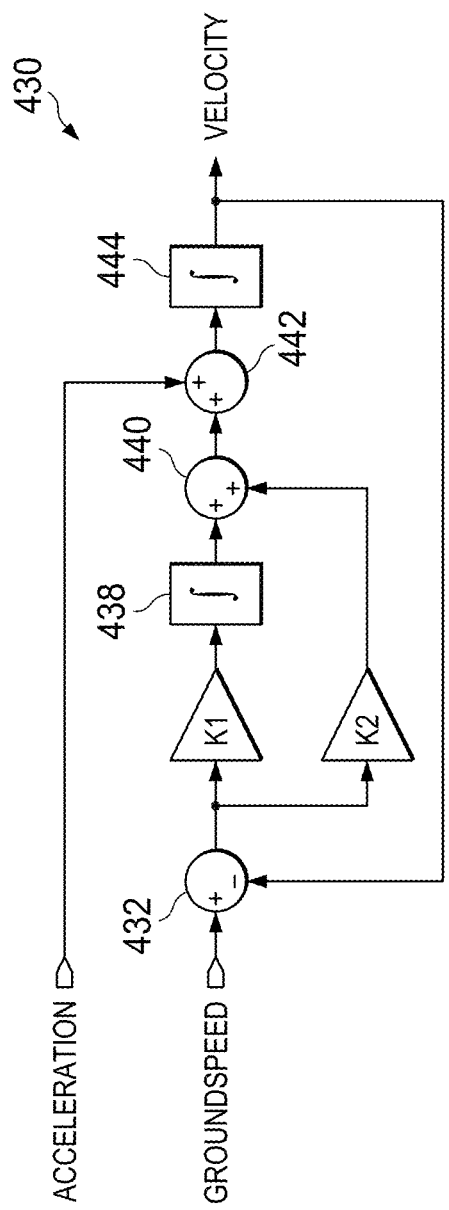
FIG. 4c illustrates a block diagram of an embodiment complimentary filter.

FIG. 4c illustrates a block diagram of embodiment complementary filter 430 that may be used by AHRS 404 to estimate the velocity of the rotorcraft based on a groundspeed determined by GPS system 402 and an acceleration measurement made by inertial sensors of AHRS 404. In an embodiment, the forward path for the ground speed is represented using gains K1 and K2, integrators 438 and 444 and summing block 440 that provides a feedforward path for gain K2. The forward path for the acceleration is represented using integrator 444 and summing block 442, and the output estimated velocity is fed back via subtraction block 432. The dynamics of the complementary filter is such that the effect of the measured acceleration on the estimated velocity dominates at higher frequencies, while the effect of the GPS determined groundspeed dominates at lower frequencies. In some embodiments, the dynamic response of complementary filter 430 may be set such that:

K1=$\omega^2$ and
K2=$2\zeta\omega$, where $\omega$ is the natural frequency and $\zeta$ is the damping factor. Complementary filter 430 may be implemented in a variety of ways using digital and/or analog signal processing techniques known in the art. For example, integrators 438 and 444 may be implemented using accumulators, gains K1 and K2 may be implemented using multipliers and summing blocks 440 and 442 and subtraction block 432 may be implemented using adders. In some embodiments, these functions are implemented by a processor that executes software code. It should also be appreciated that complementary filter 430 is just one example of many possible filter structures that could be used to provide an estimated velocity.

In embodiments of the present invention, when GPS system 402 is unable to provide accurate position measurements, the position of the rotorcraft is determined by integrating a measured velocity. For example, one situation in which GPS system 402 is generally unable to provide accurate positions measurement is when the rotorcraft flies in geographically high latitudes, such as latitudes higher than 66 degrees North or South. In embodiments of the present invention, velocity may be derived by monitoring the GPS carrier signals even in cases when GPS position data is not available or the data being transmitted on the GPS carrier is inaccurate or is otherwise unintelligible to the receiver. Moreover, using velocity data that is combined with inertial measurements allows for fast position feedback that can be used to stabilize the position of a rotorcraft in dynamic conditions.

Figure 5:
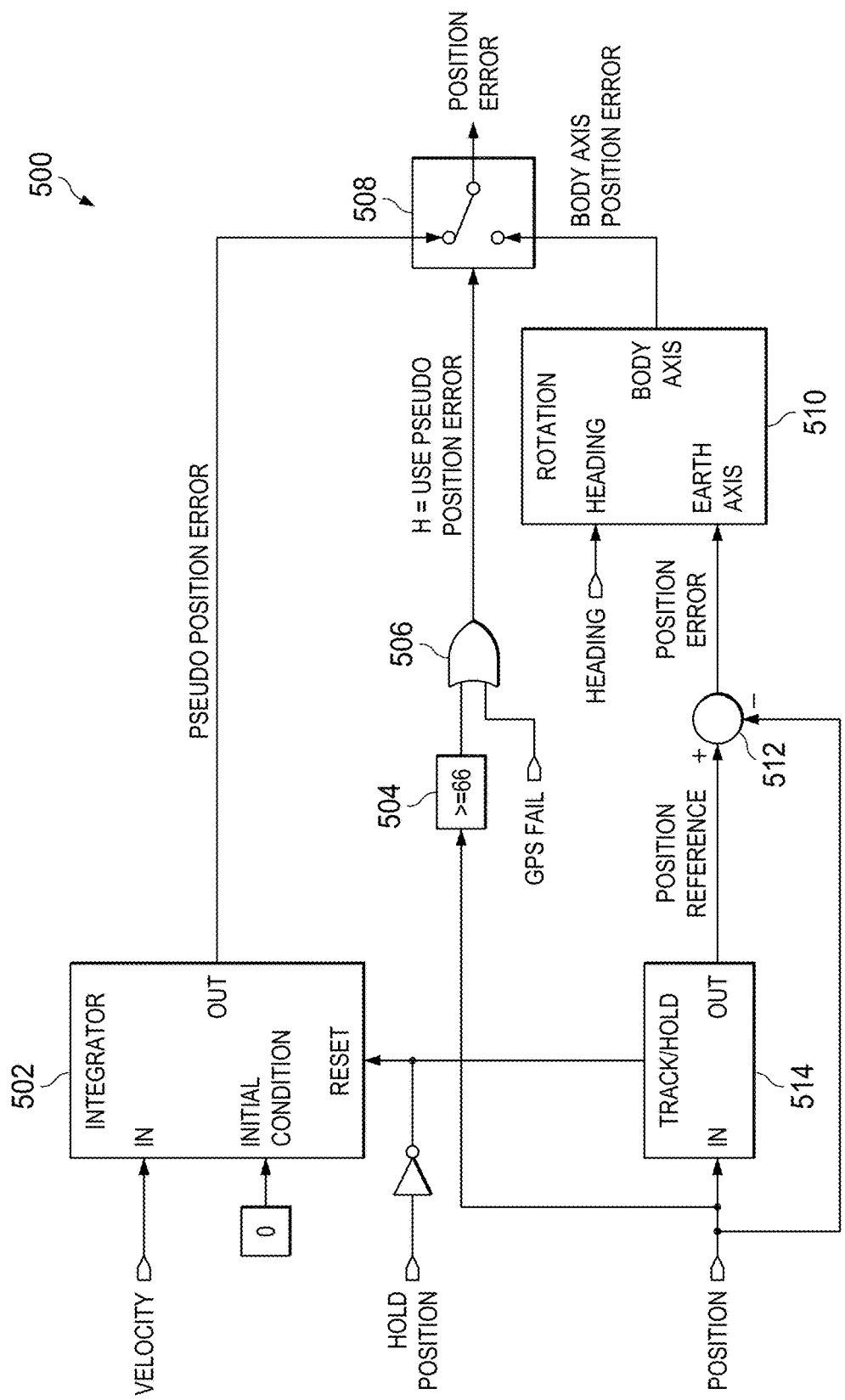
FIG. 5 illustrates a block diagram of an embodiment position hold system.

FIG. 5 illustrates a position hold system 500 that may be implemented in flight control system 201. In some embodiments, position hold system 500 is implemented in sensor processing block 330. Alternatively, position hold system 500 may be implemented in outer loop 313. As shown, position hold system 500 produces position error signal POSITION ERROR based on either GPS position signal POSITION or on a velocity signal VELOCITY that is produced by GPS system 402 by monitoring the carrier frequencies of incoming GPS signals or is produced by AHRS 404 by integrating an acceleration and combining the integrated acceleration with a velocity derived by GPS system 402. Alternatively, other methods of determining the velocity of the rotorcraft may be used.

As shown, position hold system 500 includes two signal paths that are used to determine signal POSITION ERROR. This position error maybe used by outer loop 313 to hold the rotorcraft at a fixed position. In some embodiments, signal POSITION ERROR may have two components, for example, an x component that represents along-heading position error in feet, and a y component that represents across-position heading error in feet. These position error signals may be input to the pitch and either roll or yaw rate loops of flight control system 201 to control actuators in aircraft equipment 321. The closed loop nature of the various loops then force the various components of the POSITION ERROR signal in order to keep the rotorcraft in a fixed position.

In some embodiments, the selection of which position error signal path is determined by comparator 504 and OR gate 506. As shown, comparator 504 determines whether the position signal POSITION has a latitude component that is greater than 66 degrees North or South latitude. Signal GPS FAIL is generated by GPS system 402 and indicates that the GPS position generated by GPS system 402 is not usable when asserted. If GPS FAIL is asserted or the latitude is greater than 66 degrees, the pseudo position error is selected by OR gate 506 and by switch 508.

In nominal conditions during which position data produced by GPS system 402 is accurate, a first signal path including track and hold block 514, summer 512 and earth axis to body axis transformation block 510 is used to determine the position error. During operation, when signal HOLD POSITION is not asserted, track and hold block 514 is in a track mode such that the output of track and hold block 514 is the same is that input to track and hold block 514. This causes the output of summing block to be zero, thereby producing a zero position error signal with reference to the earth axis. This zero earth axis position error is converted to a zero body axis via transformation block 510. When HOLD POSITION is asserted, track and hold block 514 is placed in a hold mode and the position error determined by summer 512 is a difference between the position held by track and hold block 514 and the position signal POSITION generated by GPS system 402. In various embodiments, HOLD POSITION may be asserted when the pilot of the rotorcraft activates the position hold mode by pressing and releasing the Force Trim Release (FTR) button on cyclic control assembly 217 while the rotorcraft in a stable hover. In one example a stable hover is considered to be when the rotorcraft has a ground speed of less than 2 knots and minimal acceleration in any direction. Alternatively, other definitions of a stable hover may be used depending on the particular rotorcraft and its specifications.

As shown, this position error produced by summer 512 is then converted from longitude and latitude Earth coordinates in degrees to body axis coordinates in feet via coordinate rotation block 510 based on the heading signal HEADING, which may be produced, for example, by AHRS 404. If the rotorcraft is moved from the desired position by outside disturbances, the downstream controller (not shown) closes the loop to return to the desired position. If the rotorcraft is moved from the desired position by a pilot input to the stick (regardless of whether FTR is pressed), the HOLD POSITION signal is de-asserted and the track and hold block 514 is once again plated in the track mode.

When the latitude of the rotorcraft is greater than 66 degrees or when the GPS FAIL signal is asserted, the pseudo position error output of integrator 502 is selected via switch 508. In various embodiments, when the HOLD SIGNAL is not asserted, integrator 502 is reset and provides a zero output. On the other hand, when HOLD SIGNAL is asserted, integrator 502 integrates the VELOCITY signal from an initial condition of zero. Alternatively, other initial conditions may be used depending on the particular embodiment and its specifications. In some embodiments, integrator 502 may include more than one integrator. For example, integrator 502 may include an integrator for each component of velocity signal VELOCITY. In some embodiments, velocity signal VELOCITY is already transformed in the body axis by AHRS 404. Therefore, coordinate rotation block 510 is not used in the pseudo position error calculation path. However, in alternative embodiments that use an earth axis based velocity measurements, an earth axis to body axis coordinate transformation could be performed on the pseudo position error as well.

In various embodiments, the various blocks shown in FIG. 5 may be implemented in software that is stored in memory and is executed by a processor. Alternatively, these elements may be implemented using hardwired or programmable logic that includes logic gates and registers that implement the various components of position error block 500. In further embodiments, position error block 500 may be implemented using other functionally equivalent logical algorithms or logic.

Figure 6:
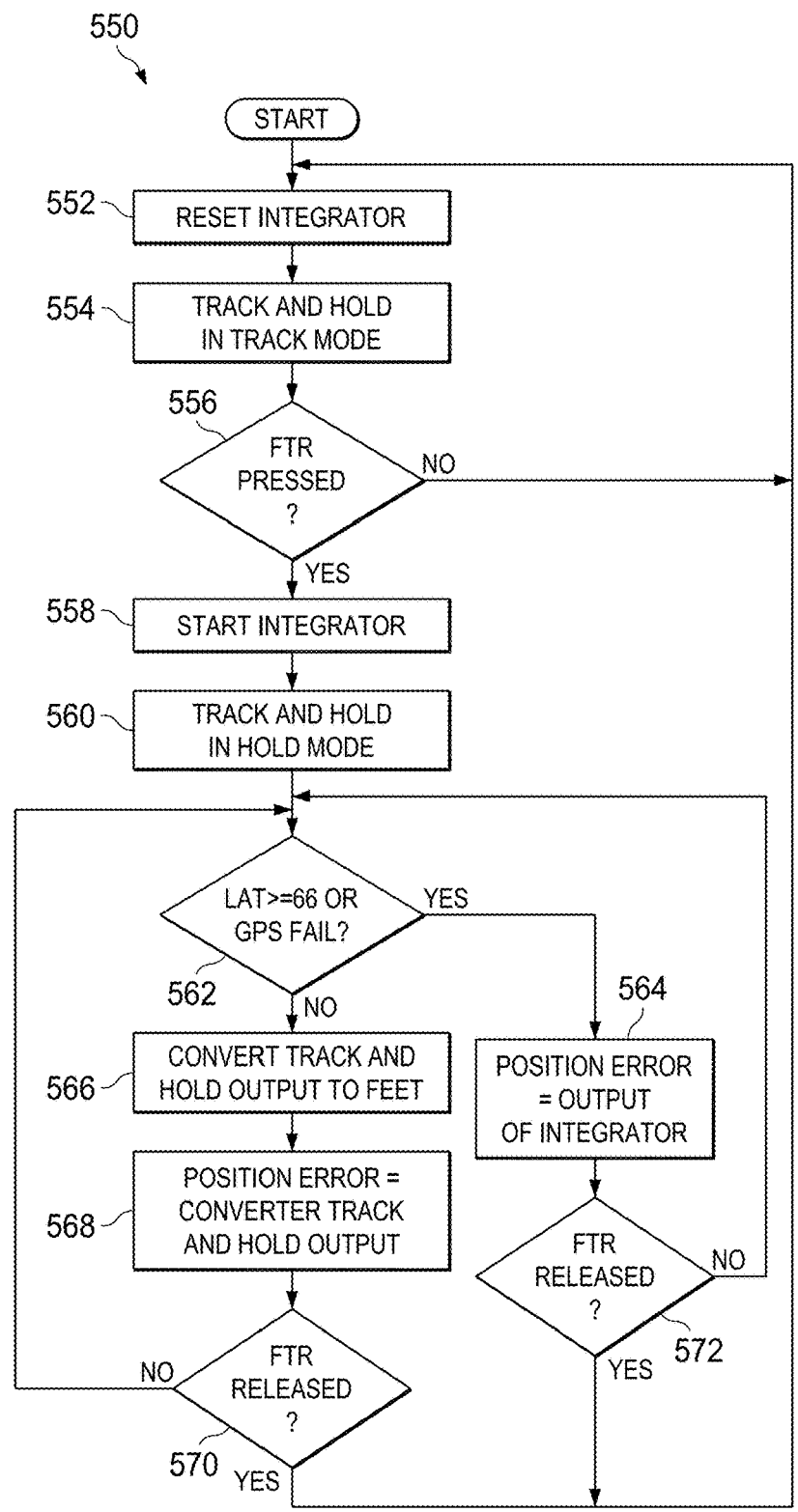
FIG. 6 illustrates a block diagram of an embodiment method of operating a position hold system.

FIG. 6 illustrates a flow chart of an embodiment method 550 of operating position error block 500. As shown, operation begins in step 552 in which integrator 502 is reset and step 554 in which track and hold block 514 is placed in the track mode. When the pilot's FTR switch is activated in step 556, integrator 502 starts integrating and track and hold block 514 is placed in hold mode. In step 562 a determination is made whether the latitude is greater than 66 degrees, in which case the position data is not usable or whether the position output of GPS system 402 is invalid, for example, due to a GPS system failure. If the latitude is greater than 66 degrees or the position output of GPS system 402 is invalid, the position error used by the position hold loop is the output of integrator 502. If, however, in step 562 a determination is made that the GPS data is valid and the latitude is less than 66 degrees, the output of track and hold block 514 is converted from longitude and latitude to feet, and the position error used by the position hold loop is taken to be the converted output of track and hold circuit 514. When the FTR button is released, operation proceeds at step 552 where integrator 502 is reset and track and hold block 514 is placed in track mode.

Figure 7:
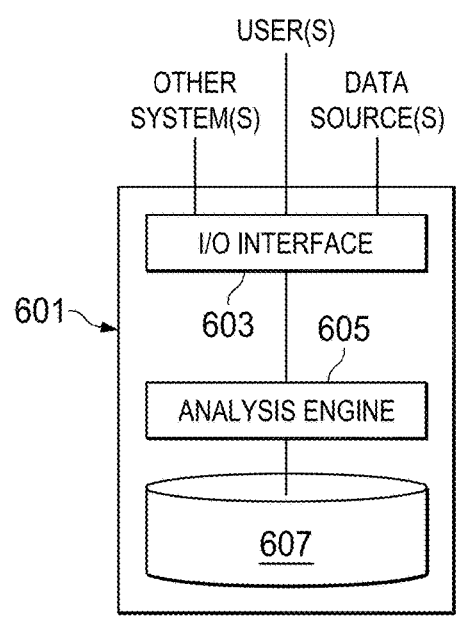
FIG. 7 illustrates a computer system that may be used to implement embodiment control algorithms.

FIG. 7 illustrates a computer system 601. The computer system 601 can be configured for performing one or more functions with regard to the operation of the flight control system 201 including position error system 500, as described herein. Further, any processing and analysis can be partly or fully performed by the computer system 601. The computer system 601 can be partly or fully integrated with other aircraft computer systems or can be partly or fully removed from the rotorcraft.

The computer system 601 can include an input/output (I/O) interface 603, an analysis engine 605, and a database 607. Alternative embodiments can combine or distribute the I/O interface 603, the analysis engine 605, and the database 607, as desired. Embodiments of the computer system 601 may include one or more computers that include one or more processors and memories configured for performing tasks described herein. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers include a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks.

The I/O interface 603 can provide a communication link between external users, systems, and data sources and components of the computer system 601. The I/O interface 603 can be configured for allowing one or more users to input information to the computer system 601 via any known input device. Examples can include a keyboard, mouse, touch screen, and/or any other desired input device. The I/O interface 603 can be configured for allowing one or more users to receive information output from the computer system 601 via any known output device. Examples can include a display monitor, a printer, cockpit display, and/or any other desired output device. The I/O interface 603 can be configured for allowing other systems to communicate with the computer system 601. For example, the I/O interface 603 can allow one or more remote computer(s) to access information, input information, and/or remotely instruct the computer system 601 to perform one or more of the tasks described herein. The I/O interface 603 can be configured for allowing communication with one or more remote data sources. For example, the I/O interface 603 can allow one or more remote data source(s) to access information, input information, and/or remotely instruct the computer system 601 to perform one or more of the tasks described herein.

The database 607 provides persistent data storage for the computer system 601. Although the term "database" is primarily used, a memory or other suitable data storage arrangement may provide the functionality of the database 607. In alternative embodiments, the database 607 can be integral to or separate from the computer system 601 and can operate on one or more computers. The database 607 preferably provides non-volatile data storage for any information suitable to support the operation of the flight control system 201, including various types of data discussed further herein. The analysis engine 605 can include various combinations of one or more processors, memories, and software components.

Embodiments of the present invention are summarized here. Other embodiments can also be understood from the entirety of the specification and the claims filed herein. One general aspect includes a method of operating a rotorcraft, the method including: operating the rotorcraft in a position hold mode including determining whether GPS position data is usable, receiving a position of the rotorcraft from a GPS sensor, determining a position error based on received GPS position data and a held position when the GPS position data is usable, determining the position error based on a rotorcraft velocity when the GPS position data is not usable, and transmitting an actuator command based on the determined position error.

Implementations may include one or more of the following features. The method where determining whether the GPS position data is usable includes: determining that the GPS position data is usable when a latitude of the rotorcraft is less than a first latitude; and determining that the GPS position data is not usable when the latitude of the rotorcraft is greater than or equal to the first latitude. Determining whether the GPS position data is usable may include determining that the GPS position data is usable when an absolute value of a latitude of the rotorcraft is less than a first latitude, and determining that the GPS position data is not usable when the absolute value of the latitude of the rotorcraft is greater than or equal to the first latitude. In some embodiments, the first latitude is 66 degrees, however, other latitudes may be used.

In an embodiment, determining the position error based on the rotorcraft velocity includes integrating the rotorcraft velocity using an integrator. Determining the position error may further include resetting the integrator when entering the position hold mode when the GPS position data is not usable. In some embodiments, the method further includes receiving the rotorcraft velocity from an inertial sensor and/or receiving the rotorcraft velocity from a GPS sensor configured to determine the rotorcraft velocity based on a signal carrier of a received GPS signal.

Another general aspect includes a flight control system for a rotorcraft including: a processor and a non-transitory computer readable storage medium with an executable program stored thereon, the executable program including instructions for: receiving position data from a first sensor; receiving velocity data; determining whether the received position data is usable; determining a position of the rotorcraft based on the received position data when the received position data is usable; and determining the position of the rotorcraft based on the received velocity data when the received position data is not usable.

Implementations may include one or more of the following features. The flight control system where the executable program further includes instructions for operating the rotorcraft in a hold mode including: when the position data is usable, entering the hold mode by sampling the position data for a first position data sample, and subtracting subsequent position data samples from the first position sample to form a position error signal; and when the position data is not usable, entering the hold mode by resetting an integrator and integrating the received velocity data using the integrator. In some embodiments, determining whether the received position data is usable includes comparing a latitude component of the position data with a first latitude, where the received position is usable when the latitude component of the position is less than the first latitude and the received position is not usable when latitude component of the position is greater than or equal to the first latitude. In some implementations, the first latitude is 66 degrees. In some systems, the first sensor includes a GPS receiver.

In an embodiment, receiving the velocity data includes receiving the velocity data from an inertial sensor. Receiving the velocity data may include receiving the velocity data from a GPS sensor configured to determine the velocity data based on a signal carrier of a received GPS signal.

A further general aspect includes a rotorcraft having: a body; a power train coupled to the body and including a power source and a drive shaft coupled to the power source; a main rotor system coupled to the power train and including a plurality of main rotor blades; a GPS receiver system configured sense a physical position and produce position coordinates based on the sensed physical position; an inertial sensor configured to determine a velocity of the rotorcraft; a flight control system operable to change at least one operating condition of the main rotor system; a pilot control assembly configured to receive commands from a pilot, where the flight control system is a fly-by-wire flight control system in electrical communication with the pilot control assembly; and a flight control computer in electrical communication between the flight control system, the GPS receiver system, and the pilot control assembly, the flight control computer configured to receive position data from the GPS receiver system; determine whether a latitude of the rotorcraft is greater than or equal to a first latitude; receive the velocity from the inertial sensor; hold the rotorcraft at a fixed position based on the received position data when the latitude of the rotorcraft is not greater than or equal to a first latitude; and hold the rotorcraft at the fixed position based on the velocity when the latitude of the rotorcraft is greater than or equal to the first latitude.

Implementations may include one or more of the following features. The rotorcraft where the first latitude is 66 degrees. The rotorcraft where the flight control computer configured to hold the rotorcraft at the fixed position based on the velocity by: resetting an integrator when the rotorcraft is at the fixed position; integrating the velocity to determine a position error using the integrator; determining an actuator command based on the position error; and transmitting the actuator command to the main rotor system. In some embodiments, resetting the integrator includes resetting the integrator upon receipt of a force trim release (FTR) command from a pilot control assembly.

Advantages of embodiments include the ability for a rotorcraft to accurately control a fixed position in a system at high latitudes or when GPS position data is not available. Further advantages include the automatic transition from traditional position control to a position hold algorithm suitable in the GPS-denied conditions. This transition occurs without requiring pilot input or prior evaluation of the system status or environmental conditions.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of operating a rotorcraft, the method comprising:
    operating the rotorcraft in a position hold mode comprising determining whether GPS position data is usable for determining a position of the rotorcraft;
    receiving the position of the rotorcraft from a GPS sensor;
    determining a position error based on received GPS position data and a held position when the GPS position data is usable based on the determining whether the GPS position data is usable;
    determining the position error based on an adjusted rotorcraft velocity estimate when the GPS position data is not usable for determining the position of the rotorcraft, wherein the adjusted rotorcraft velocity estimate is determined by receiving a GPS velocity estimate based on carrier frequencies of received GPS signals, receiving an inertial acceleration from an inertial sensor, and determining the adjusted rotorcraft velocity estimate based on the inertial acceleration and the GPS velocity estimate, wherein determining the adjusted rotorcraft velocity estimate further comprises:
subtracting the adjusted rotorcraft velocity estimate from the GPS velocity estimate to form an error signal,
integrating the error signal to form an integrated GPS velocity estimate,
summing the inertial acceleration with the integrated GPS velocity estimate to form a summed estimate, and
integrating the summed estimate to form the adjusted rotorcraft velocity estimate; and
transmitting an actuator command based on the determined position error.

2. The method of claim 1, wherein determining whether the GPS position data is usable comprises;
determining that the GPS position data is usable when a latitude of the rotorcraft is less than a first latitude; and
determining that the GPS position data is not usable when the latitude of the rotorcraft is greater than or equal to the first latitude.

3. The method of claim 1, wherein determining whether the GPS position data is usable comprises;
determining that the GPS position data is usable when an absolute value of a latitude of the rotorcraft is less than a first latitude; and
determining that the GPS position data is not usable when the absolute value of the latitude of the rotorcraft is greater than or equal to the first latitude.

4. The method of claim 3, wherein the first latitude is 66 degrees.

5. The method of claim 1, wherein determining the position error based on the adjusted rotorcraft velocity comprises integrating the adjusted rotorcraft velocity using an integrator.

6. The method of claim 5, wherein determining the position error further comprises resetting the integrator when entering the position hold mode when the GPS position data is not usable.

7. A flight control system for a rotorcraft comprising:
a processor and a non-transitory computer readable storage medium with an executable program stored thereon, the executable program including instructions for:
receiving position data from a first sensor;
receiving velocity data;
determining whether the received position data is usable;
determining a position of the rotorcraft based on the received position data when the received position data is usable; and
determining the position of the rotorcraft based on the received velocity data when the received position data is not usable, wherein
the first sensor comprises a GPS receiver,
receiving the velocity data comprises receiving a GPS velocity estimate based on carrier frequencies of received GPS signals from the GPS receiver,
receiving the position data comprises receiving GPS position data from the GPS receiver,
the executable program further includes instructions for receiving an inertial acceleration from an inertial sensor, and
determining the position of the rotorcraft based on the received velocity data comprises determining an adjusted velocity estimate based on the GPS velocity estimate and the inertial acceleration and determining the position of the rotorcraft based on the adjusted velocity estimate, wherein determining the adjusted velocity estimate comprises:
subtracting the adjusted velocity estimate from the GPS velocity estimate to form an error signal,
integrating the error signal to form an integrated GPS velocity estimate,
summing the inertial acceleration with the integrated GPS velocity estimate to form a summed estimate, and
integrating the summed estimate to form the adjusted velocity estimate.

8. The flight control system of claim 7, wherein the executable program further includes instructions for operating the rotorcraft in a hold mode comprising:
when the position data is usable, entering the hold mode by sampling the position data for a first position data sample, and subtracting subsequent position data samples from the first position data sample to form a position error signal; and
when the position data is not usable, entering the hold mode by resetting an integrator and integrating the received velocity data using the integrator.

9. The flight control system of claim 7, wherein determining whether the received position data is usable comprising comparing a latitude component of the position data with a first latitude, wherein the received position data is usable when the latitude component of the position is less than the first latitude and the received position data is not usable when latitude component of the position is greater than or equal to the first latitude.

10. The flight control system of claim 9, wherein the first latitude is 66 degrees.

11. A rotorcraft comprising:
a body;
a power train coupled to the body and comprising a power source and a drive shaft coupled to the power source;
a main rotor system coupled to the power train and comprising a plurality of main rotor blades;
a GPS receiver system configured sense a physical position and produce position coordinates based on the sensed physical position and produce a GPS velocity estimate of based on carrier frequencies of received GPS signals;
an inertial sensor configured to determine an inertial acceleration of the rotorcraft;
a flight control system operable to change at least one operating condition of the main rotor system;
a pilot control assembly configured to receive commands from a pilot, wherein the flight control system is a fly-by-wire flight control system in electrical communication with the pilot control assembly; and
a flight control computer in electrical communication between the flight control system, the GPS receiver system, and the pilot control assembly, the flight control computer configured to
receive GPS position data and the GPS velocity estimate from the GPS receiver system;
determine whether a latitude of the rotorcraft is greater than or equal to a first latitude;
receive the inertial acceleration from the inertial sensor;
hold the rotorcraft at a fixed position based on the received GPS position data when the latitude of the rotorcraft is not greater than or equal to the first latitude; and hold the rotorcraft at the fixed position based on the GPS velocity estimate and the inertial acceleration and not based on the GPS position data when the latitude of the rotorcraft is greater than or equal to the first latitude by determining an adjusted velocity estimate based on the GPS velocity estimate and the inertial acceleration, wherein the flight control computer configured to determine the adjusted velocity estimate by:

subtracting the adjusted velocity estimate from the GPS velocity estimate to form an error signal, integrating the error signal to form an integrated GPS velocity estimate, summing the inertial acceleration with the integrated GPS velocity estimate to form a summed estimate, and integrating the summed estimate to form the adjusted velocity estimate.

12. The rotorcraft of claim 11, wherein the first latitude is 66 degrees.

13. The rotorcraft of claim 11, wherein the flight control computer is configured to hold the rotorcraft at the fixed position based on the adjusted velocity estimate by:

resetting an integrator when the rotorcraft is at the fixed position;

integrating the adjusted velocity estimate to determine a position error using the integrator;

determining an actuator command based on the position error; and transmitting the actuator command to the main rotor system.

14. The rotorcraft of claim 13, wherein resetting the integrator comprises resetting the integrator upon receipt of a force trim release (FTR) command from the pilot control assembly.

* * * * *